(12) United States Patent
Hayashi et al.

(10) Patent No.: US 8,581,533 B2
(45) Date of Patent: Nov. 12, 2013

(54) MOTOR DRIVER AND METHOD OF CONTROLLING THE SAME

(75) Inventors: Kazuhito Hayashi, Inazawa (JP); Masayoshi Suhama, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 397 days.

(21) Appl. No.: 13/123,475

(22) PCT Filed: Oct. 8, 2009

(86) PCT No.: PCT/IB2009/007073
§ 371 (c)(1),
(2), (4) Date: Apr. 8, 2011

(87) PCT Pub. No.: WO2010/041130
PCT Pub. Date: Apr. 15, 2010

(65) Prior Publication Data
US 2011/0193506 A1    Aug. 11, 2011

(30) Foreign Application Priority Data

Oct. 9, 2008  (JP) ................................. 2008-263135

(51) Int. Cl.
*H02P 6/10* (2006.01)
(52) U.S. Cl.
USPC ................. 318/400.23; 318/400.01; 318/471; 318/472; 318/801; 361/24; 361/25; 361/274.1; 310/315; 310/68 C; 324/431; 324/441; 324/750.03; 324/750.06
(58) Field of Classification Search
USPC ............... 318/634, 641, 400.01, 400.08, 471, 318/472, 400.23, 492; 324/431, 441, 324/750.03, 750.06; 310/315, 680; 335/146, 217; 337/304; 361/24, 25, 37, 361/274.1
See application file for complete search history.

(56) References Cited

U.S. PATENT DOCUMENTS

| 7,099,793 B2 * | 8/2006 | Rechberger .................... 702/130 |
| 2005/0096683 A1 | 5/2005 | Ellins et al. |
| 2007/0290650 A1 | 12/2007 | Muta |

FOREIGN PATENT DOCUMENTS

| EP | 1 788 698 A1 | 5/2007 | |
| JP | 9-275696 | 10/1997 | |
| JP | 2006-254521 A | 9/2006 | |
| JP | 2006254521 A * | 9/2006 | ............. H02P 21/00 |
| JP | 2006-333572 A | 12/2006 | |
| JP | 2007-020246 A | 1/2007 | |
| JP | 2007-267527 A | 10/2007 | |
| JP | 2008-178166 A | 7/2008 | |
| JP | 2008-199738 A | 8/2008 | |
| JP | 2008-206338 A | 9/2008 | |

\* cited by examiner

*Primary Examiner* — Antony M Paul
(74) *Attorney, Agent, or Firm* — Kenyon & Kenyon LLP

(57) ABSTRACT

A controller controls switching of IGBT devices of an inverter according to the desired output of the permanent magnet motor. The controller includes: a magnet temperature detection device that detects the magnet temperature of the permanent magnet motor based on the output of a temperature sensor; a setting device that sets a threshold value of the magnet temperature corresponding to the desired output of the permanent magnet motor, based on a predetermined relation between the output from the permanent magnet motor and a critical temperature, up to which demagnetization in the permanent magnet motor is not caused; and a carrier frequency control device that, when the magnet temperature detected by the magnet temperature detection device exceeds the threshold value, changes the carrier frequency, at which the IGBT devices are switched, such that a ripple current superimposed on a motor current that flows through the permanent magnet motor is reduced.

10 Claims, 9 Drawing Sheets

MOTOR DRIVER AND METHOD OF CONTROLLING THE SAME

This is a 371 national phase application of PCT/82009/007073 filed 8 Oct. 2009, claiming priority to Japanese Patent Application No. 2008-263135 filed 9 Oct. 2008, the contents of which are incorporated herein by reference.

BACKGROUND OF THE INVENTION

1. Field of the Invention

The invention relates to a motor driver and a method of controlling the motor driver, and in particular to a motor driver that drives a permanent magnet motor and a method of controlling the motor driver.

2. Description of the Related Art

Typically, in a vehicle, such as an electric vehicle or a hybrid vehicle, the driving force generated by electric energy is obtained by converting the direct current voltage supplied from a high-voltage power source into a three-phase alternating-current power with the use of an inverter and rotating the three-phase alternating-current motor with the use of the alternating-current power. When the vehicle is decelerated, inversely, the regenerated energy obtained by the regenerative power generation by the three-phase alternating-current motor is stored in the power source, whereby the vehicle is driven without wasting energy.

In such a hybrid vehicle or an electric vehicle, as the three-phase alternating-current motor, a permanent magnet motor is widely used because of its high power density and high efficiency. The permanent magnet motor is controlled by controlling the amplitude and phase of the electric current that flows through the permanent magnet motor by switching the switching devices constituting the inverter at a high frequency equal to or higher than a few kilohertz.

For example, in Japanese Patent Application Publication No. H9-275696 (JP-A-9-275696), a controller for controlling drive of a permanent magnet motor is disclosed that has a high-frequency electric current supply means for supplying high-frequency electric current to the coils of the stator when the temperature of the permanent magnet is equal to or below a predetermined value. According to this document, because there is a possibility of the occurrence of demagnetization due to the reduction in coercivity of the permanent magnet in a low temperature environment, under low temperature conditions, high-frequency magnetic field is generated by the high-frequency electric current that is supplied to the coils of the stator, whereby the permanent magnet is heated by the iron loss caused in the core portion as the high-frequency magnetic field is formed.

In the inverter that drives the permanent magnet motor, when switching devices are switched on and off, the ripple current depending on the switching frequency is generated. The ripple current increases as the switching frequency is reduced. Thus, it is preferable that the switching frequency be reduced to suppress the electric power loss caused in the inverter during switching operation. However, when the switching frequency is reduced, the ripple current increases.

When the ripple current increases, in the permanent magnet motor, harmonic loss is caused because the magnetic flux density therein includes harmonic components. In particular, when a rare-earth permanent magnet is used, the electrical conductivity is relatively high and therefore, there is a possibility that eddy currents are generated in the permanent magnet and increase the loss. Such increase in the eddy-current loss increases the magnet temperature and thus causes demagnetization in the permanent magnet motor. Due to the occurrence of such demagnetization, a problem can arise that the operational efficiency (rotation efficiency and power generation efficiency) is reduced in the permanent magnet motor. However, in the above-cited JP-A-9-275696, an object is to prevent the occurrence of demagnetization caused in the permanent magnet motor under low temperature conditions and there is no mention concerning the means for preventing the occurrence of demagnetization due to such increase in the magnet temperature.

SUMMARY OF THE INVENTION

The invention provides a motor driver, in which demagnetization of the permanent magnet motor is suppressed, and a method of controlling the motor driver.

According to an aspect of the invention, a motor driver that receives electric power supply from a power source to drive a permanent magnet motor includes: an inverter that has a switching device and performs electric power conversion between the power source and the permanent magnet motor; and a controller that controls switching of the switching device according to a desired output of the permanent magnet motor. The controller includes: a magnet temperature detection device that detects a magnet temperature of the permanent magnet motor, a setting device that sets a threshold value of the magnet temperature corresponding to the desired output of the permanent magnet motor, based on a predetermined relation between the output from the permanent magnet motor and a critical temperature, up to which demagnetization in the permanent magnet motor is not caused; and a carrier frequency control device that, when the magnet temperature detected by the magnet temperature detection device exceeds the threshold value, changes a carrier frequency, at which the switching device is switched, in such a manner that a ripple current superimposed on a motor current that flows through the permanent magnet motor is reduced.

The carrier frequency control device may increase the carrier frequency when the magnet temperature detected by the magnet temperature detection device exceeds the threshold value.

The carrier frequency control device may have a first map for setting the carrier frequency according to the output from the permanent magnet motor. In the first map, an entire region is divided into a plurality of regions, in each of which the carrier frequency is set that differs from the carrier frequency set in another region, based on a torque and rotational speed of the permanent magnet motor. The plurality of regions include a first region in which the carrier frequency is set relatively high and a second region in which the carrier frequency is set lower than the carrier frequency set in the first region. In this case, when the magnet temperature detected by the magnet temperature detection device exceeds the threshold value, the carrier frequency control device changes the carrier frequency by setting the carrier frequency with the use of a second map that is obtained by changing the first map so that the first region in the first map is expanded toward the second region.

The controller may further include a device temperature detection device that detects the device temperature of the switching device. In this case, if the magnet temperature detected by the magnet temperature detection device is equal to or below the threshold value, the carrier frequency control device reduces the carrier frequency when the device temperature detected by the device temperature detection device exceeds a predetermined allowable temperature.

The permanent magnet motor may be configured to generate a driving force of a vehicle. The controller may further include a vehicle speed detection device that detects the speed of the vehicle. In this case, if the magnet temperature detected by the magnet temperature detection device is equal to or below the threshold value, the carrier frequency control device changes the carrier frequency to a frequency out of an audible frequency range when the vehicle speed detected by the vehicle speed detection device is lower than a predetermined reference speed.

According to another aspect of the invention, a method of controlling a motor driver that receives electric power supply from a power source to drive a permanent magnet motor and that includes an inverter that has a switching device and performs electric power conversion between the power source and the permanent magnet motor by switching the switching device. The method includes: detecting a magnet temperature of the permanent magnet motor, setting a threshold value of the magnet temperature corresponding to the desired output of the permanent magnet motor, based on a predetermined relation between an output from the permanent magnet motor and a critical temperature, up to which demagnetization in the permanent magnet motor is not caused; and when the detected magnet temperature exceeds the threshold value, changing a carrier frequency, at which the switching device is switched, in such a manner that a ripple current superimposed on a motor current that flows through the permanent magnet motor is reduced.

The step of changing the carrier frequency may increase the carrier frequency when the detected magnet temperature exceeds the threshold value.

The step of changing the carrier frequency may use a first map for setting the carrier frequency according to the output from the permanent magnet motor. In the first map, an entire region is divided into a plurality of regions, in each of which the carrier frequency is set that differs from the carrier frequency set in another region, based on a torque and rotational speed of the permanent magnet motor. The plurality of regions include a first region in which the carrier frequency is set relatively high and a second region in which the carrier frequency is set lower than the carrier frequency set in the first region. In this case, when the detected magnet temperature exceeds the threshold value, the step of changing the carrier frequency changes the carrier frequency by setting the carrier frequency with the use of a second map that is obtained by changing the first map so that the first region in the first map is expanded toward the second region.

The method may further include detecting a device temperature of the switching device. In this case, if the detected magnet temperature is equal to or below the threshold value, the step of changing the carrier frequency reduces the carrier frequency when the detected device temperature exceeds a predetermined allowable temperature.

The permanent magnet motor may be configured to generate a driving force of a vehicle. The method may further include detecting the speed of the vehicle. In this case, if the detected magnet temperature is equal to or below the threshold value, the step of changing the carrier frequency changes the carrier frequency to a frequency out of an audible frequency range when the detected vehicle speed is lower than a predetermined reference speed.

According to the invention, in the motor driver that drives a permanent magnet motor, demagnetization in the permanent magnet motor is suppressed.

BRIEF DESCRIPTION OF THE DRAWINGS

The foregoing and further objects, features and advantages of the invention will become apparent from the following description of example embodiments with reference to the accompanying drawings, wherein like numerals are used to represent like devices and wherein.

DETAILED DESCRIPTION OF EMBODIMENTS

Figure 1:
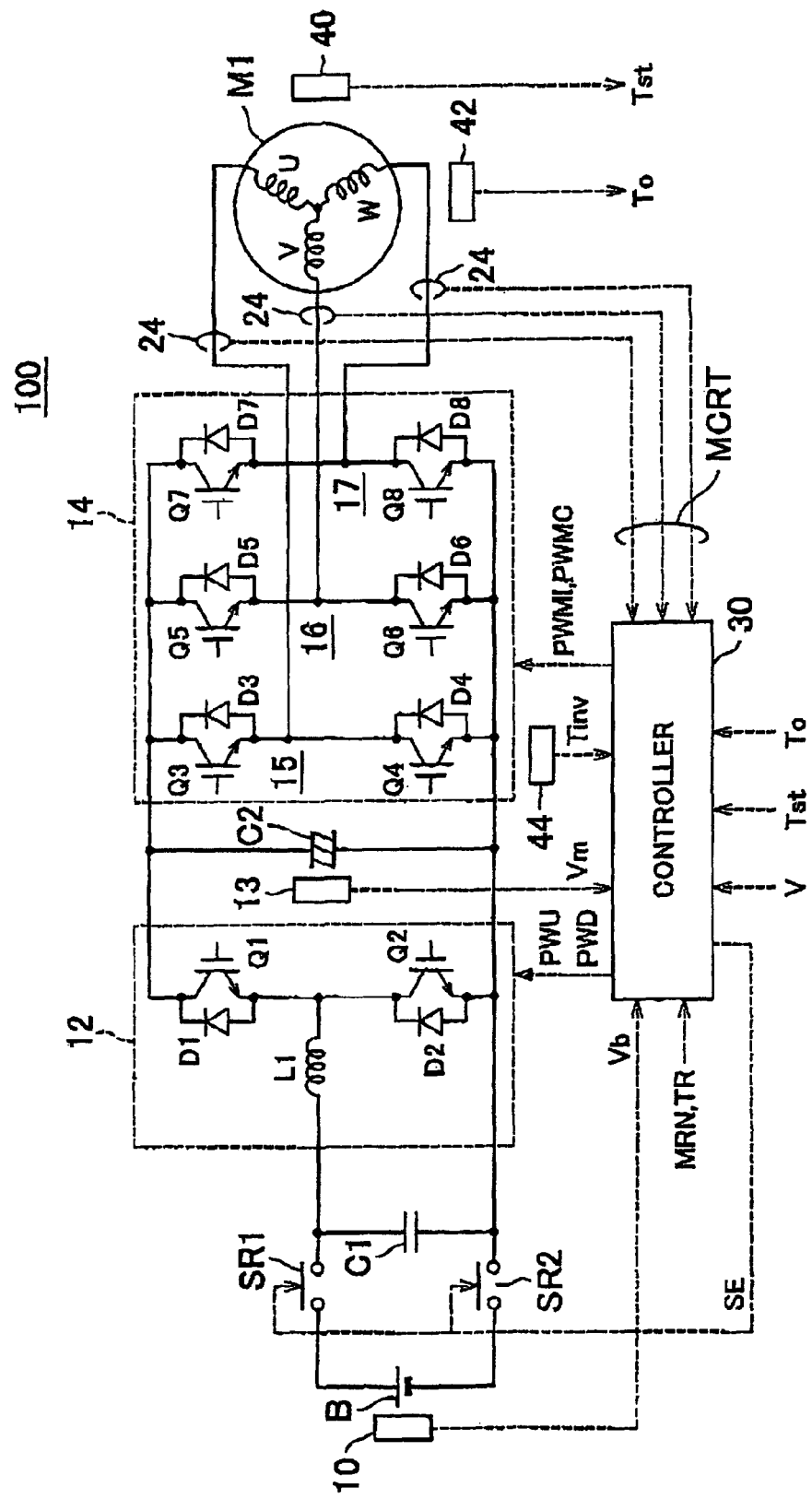
FIG. 1 is a schematic block diagram of a motor driver according to a first embodiment of the invention.

Embodiments of the invention will be described below in detail with reference to drawings. In the drawings, the same reference numerals designate the same or corresponding parts.

First Embodiment

FIG. 1 is a schematic block diagram of a motor driver according to a first embodiment of the invention.

Referring to FIG. 1, the motor driver 100 includes a battery B, voltage sensors 10 and 13, electric current sensors 24, system relays SR1 and SR2, capacitors C1 and C2, a boost converter 12, an inverter 14, temperature sensors 40, 42, 44, and a controller 30.

A permanent magnet motor M1 is a three-phase alternating-current synchronous motor, which includes a U-phase coil, a V-phase coil, and a W-phase coil. The permanent magnet motor M1 is a drive motor that produces the torque for driving wheels of a hybrid vehicle or an electric vehicle. The permanent magnet motor M1 functions as an electricity generator that is driven by an engine and functions as an electric motor for the engine. For example, the permanent magnet motor M1 may be incorporated into a hybrid vehicle so as to be able to start the engine.

The temperature sensor 40 detects the temperature Tst of a stator of the permanent magnet motor M1. The temperature sensor 40 includes a temperature measuring device, such as a thermistor, that is provided near the stator coil, for example. The temperature sensor 42, provided in a passage for a coolant, such as a cooling oil, for cooling the permanent magnet motor M1, detects the temperature (cooling oil temperature) To of the coolant.

The battery B is a rechargeable secondary battery, which is a nickel-hydrogen battery or a lithium-ion battery, for example. The battery B is not limited to these batteries. One that can generate direct-current voltage, such as a capacitor, a solar cell, a fuel cell, etc. for example, can be used as the battery B. The voltage sensor 10 detects the direct-current voltage Vb that is output from the battery B and outputs the detected direct-current voltage Vb to the controller 30. The opening and closing of the system relays SR1 and SR2 is controlled by a signal SE from the controller.

The capacitor C1 smoothes the direct-current voltage Vb that is supplied from the battery B and the smoothed direct-current voltage Vb is output to the boost converter 12.

The boost converter 12 step ups the direct-current voltage supplied from the capacitor C1 and supplies the stepped-up voltage to the capacitor C2. The inverter 14 converts the direct-current voltage supplied from the capacitor C2 into three-phase alternating currents and outputs the alternating currents to the permanent magnet motor M1.

The boost converter 12 includes a reactor L1, insulated gate bipolar transistor (IGBT) devices Q1 and Q2, and diodes D1 and D2.

One end of the reactor L1 is connected to a power line of the battery B and the other end thereof is connected to a middle point between the IGBT device Q1 and the IGBT device Q2, that is, connected between the emitter of the IGBT device Q1 and the collector of the IGBT device Q2. The IGBT devices Q1 and Q2 are connected in series between the power line and the earth line. The collector of the IGBT device Q1 is connected to the power line and the emitter of the IGBT device Q2 is connected to the earth line. The diodes D1 and D2, which allow electric current to flow from the emitter side to the collector side, are connected between the collector and the emitter of the IGBT device Q1 and between the collector and the emitter of the IGBT device Q2, respectively.

The capacitor C2 smoothes the direct-current voltage that is supplied from the boost converter 12 and supplies the smoothed direct-current voltage to the inverter 14. The voltage sensor 13 detects the voltage across the capacitor C2, that is, the output voltage Vm of the boost converter 12, which corresponds to the input voltage of the inverter 14 (hereinafter the same applies), and the voltage sensor 13 outputs the detected output voltage Vm to the controller 30.

The inverter 14 converts the output voltage Vm of the boost converter 12 into three-phase alternating currents and outputs the alternating currents to the permanent magnet motor M1 that drives the vehicle wheels. Meanwhile, during the regenerative braking, the inverter 14 returns the electric power generated in the permanent magnet motor M1 to the boost converter 12. The boost converter 12 is controlled by the controller 30 so as to function as a buck circuit.

The inverter 14 includes a U-phase arm 15, a V-phase arm 16, and a W-phase arm 17. The U-phase arm 15, the V-phase arm 16, and the W-phase arm 17 are connected in parallel between the output lines of the boost converter 12.

The U-phase arm 15 includes IGBT devices Q3 and Q4 that are connected in series, the V-phase arm 16 includes IGBT devices Q5 and Q6 that are connected in series, and the W-phase arm 17 includes IGBT devices Q7 and Q8 that are connected in series. Diodes D3 to D8, which allow electric current to flow from the emitter side to the collector side, are connected between the collectors and the emitters of the IGBT devices Q3 to Q8, respectively.

The middle points of the respective phase arms are connected to the ends of the respective phase coils of the permanent magnet motor M1. In other words, the permanent magnet motor M1 is a three-phase alternating-current synchronous motor, in which one ends of the three, U-, V-, and W-phase coils are commonly connected at the center point. The other end of the U-phase coil is connected to the middle point between the IGBT devices Q3 and Q4, the other end of the V-phase coil is connected to the middle point between the IGBT devices Q5 and Q6, and the other end of the W-phase coil is connected to the middle point between the IGBT devices Q7 and Q8.

The electric current sensors 24 detect the electric currents that flow through the permanent magnet motor M1, the electric currents being the motor currents MCRT, and output the detected motor currents MCRT to the controller 30. The temperature sensor 44 detects the device temperature Tinv of the IGBT devices Q3 to Q8 that constitute the inverter 14 and outputs the detected device temperature Tinv to the controller 30.

The controller 30 receives a torque command value TR and a motor rotational speed MRN from an electronic control unit (ECU) provided externally, receives the direct-current voltage Vb from the voltage sensor 10, receives the output voltage Vm from the voltage sensor 13, and receives the motor currents MCRT from the current sensors 24. The controller 30 then outputs, to the boost converter 12, a signal PWU indicative of a command to step up the voltage and a signal PWD indicative of a command to step down the voltage.

The controller 30 generates a signal PWMI for instructing the inverter 14 to convert the direct-current voltage, which is the output of the boost converter 12, into the alternating current voltage for driving the permanent magnet motor M1, and a signal PWMC for instructing the inverter 14 to perform an regenerative operation in which the alternating current voltage generated by the permanent magnet motor M1 is converted into a direct-current voltage and the direct-current voltage is returned to the boost converter 12 side. The method of generating the signal PWU and the signal PWMI will be described later.

Figure 2:
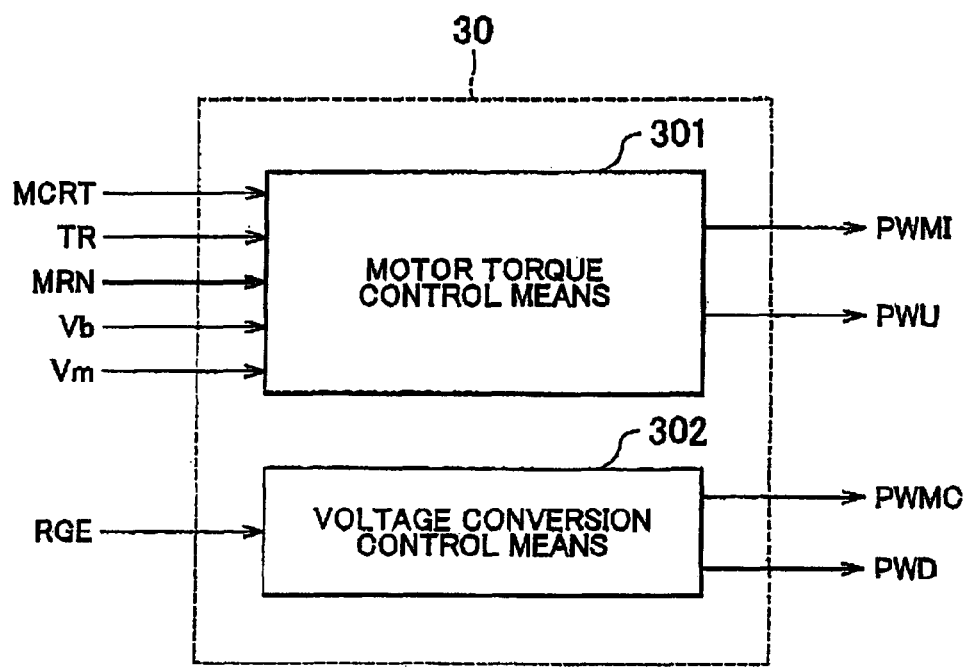
FIG. 2 is a functional block diagram of a controller.

FIG. 2 is a functional block diagram of the controller 30. Referring to FIG. 2, the controller 30 includes a motor torque control means 301 and a voltage conversion control means 302.

While the permanent magnet motor M1 is driven, the motor torque control means 301 generates the signal PWU for turning on and off the IGBT devices Q1 and Q2 of the boost converter 12 and the signal PWMI for turning on and off the IGBT devices Q3 to Q8 of the inverter 14 by a method described below, based on the torque command value TR, the direct-current voltage Vb output from the battery B, the motor currents MCRT, the motor rotational speed MRN, and the output voltage Vm of the boost converter 12, and the motor torque control means 301 outputs the generated signals PWU and PWMI to the boost converter 12 and the inverter 14, respectively.

The motor torque control means 301 detects the magnet temperature Tm by estimating a magnet temperature Tm of the permanent magnet motor M1 based on the stator temperature Tst and the cooling oil temperature To of the permanent magnet motor M1. The motor torque control means 301 changes the carrier frequency fc for generating the signal PWMI by a method described below, according to the detected magnet temperature Tm.

When at the time of regenerative braking, the voltage conversion control means 302 receives, from the external ECU, a signal RGE indicating that the hybrid vehicle or the electric vehicle is brought into a regenerative braking mode, the voltage conversion control means 302 generates the signal PWMC for converting the alternating current voltage generated by the permanent magnet motor M1 into a direct-current voltage and outputs the signal PWMC to the inverter 14.

When the voltage conversion control means 302 receives the signal RGE from the external ECU at the time of regenerative braking, the voltage conversion control means 302 generates the signal PWD for stepping down the direct-current voltage supplied from the inverter 14 and outputs the signal PWD to the boost converter 12. Thus, the boost converter 12 can also step down the direct-current voltage in accordance with the signal PWD for stepping down the direct-current voltage, and therefore, the boost converter 12 functions as a two-way converter.

Figure 3:
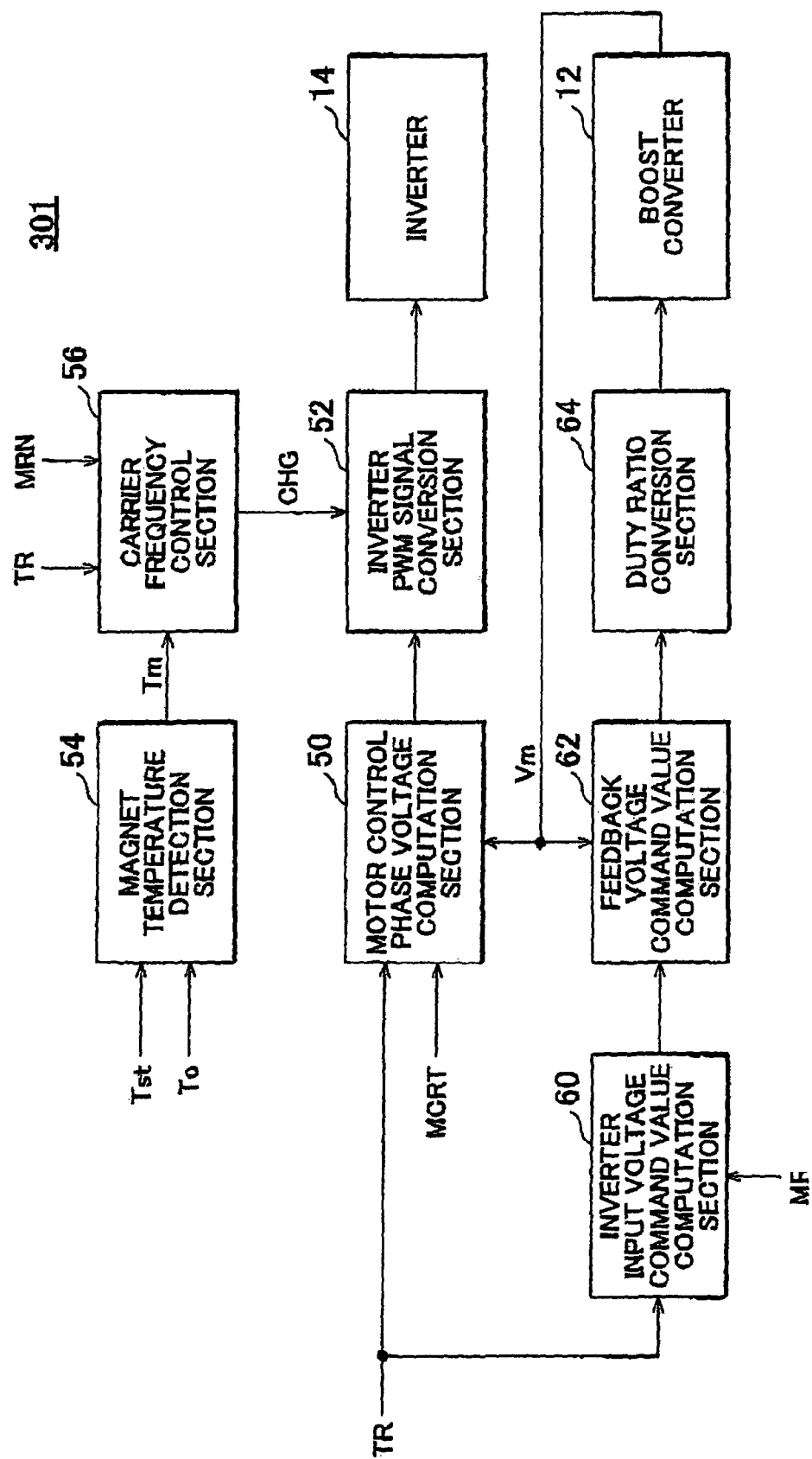
FIG. 3 is a functional block diagram of a motor torque control means.

FIG. 3 is a functional block diagram of the motor torque control means 301. Referring to FIG. 3, the motor torque control means 301 includes an inverter input voltage command computation section 60, a feedback voltage command computation section 62, a duty ratio conversion section 64, a motor control phase voltage computation section 50, an inverter PWM signal conversion section 52, a magnet temperature detection section 54, and a carrier frequency control section 56.

The inverter input voltage command computation section 60 computes the optimum value (target value) of the inverter input voltage, that is, a voltage command value Vdccom, based on the torque command value TR and the motor rotational speed MRN, and outputs the computed voltage command value Vdccom to the feedback voltage command computation section 62.

The feedback voltage command computation section 62 computes a feedback voltage command value Vdccom_fb based on the output voltage Vm of the boost converter 12 sent from the voltage sensor 13 and the voltage command value Vdccom sent from the inverter input voltage command computation section 60, and outputs the computed feedback voltage command value Vdccom_fb to the duty ratio conversion section 64.

The duty ratio conversion section 64 computes the duty ratio DR for setting the output voltage Vm, output from the voltage sensor 13, to the feedback voltage command value Vdccom_fb, output from the feedback voltage command computation section 62, based on the battery voltage Vb output from the voltage sensor 10, the output voltage Vm output from the voltage sensor 13, and the feedback voltage command value Vdccom_fb output from the feedback voltage command computation section 62. The duty ratio conversion section 64 then generates the signal PWU for turning on and off the IGBT devices Q1 and Q2 of the boost converter 12 based on the computed duty ratio DR, and outputs the generated signal PWU to the IGBT devices Q1 and Q2 of the boost converter 12.

By increasing the duty factor of the lower side IGBT device Q2 of the boost converter 12, the electric power stored in the reactor L1 is increased and it is therefore possible to obtain a higher voltage output. On the other hand, when the duty factor of the higher side IGBT device Q1 is increased, the voltage of the power line is reduced. Thus, it is possible to control the voltage of the power line to a desired voltage higher than the output voltage of the battery B by controlling the duty ratio of the IGBT devices Q1 and Q2.

The motor control phase voltage computation section 50 receives, from the voltage sensor 13, the output voltage Vm of the boost converter 12, that is, the input voltage of the inverter 14, receives, from the current sensors 24, the motor currents MCRT that flow through the respective phase arms of the permanent magnet motor M1, and receives the torque command value TR from the external ECU. The motor control phase voltage computation section 50 computes the voltage applied to the coils of the respective phases of the permanent magnet motor M1 based on these input signals and supplies the computation result to the inverter PWM signal conversion section 52.

The magnet temperature detection section 54 detects the magnet temperature Tm of the permanent magnet motor M1 based on the outputs from the temperature sensors 40 and 42 (FIG. 1). The method of detecting the magnet temperature Tm may be selected from various methods. In this embodiment, the magnet temperature Tm is detected by estimating the magnet temperature Tm based on the stator temperature Tst detected by the temperature sensor 40 and the cooling water temperature Tw detected by the temperature sensor 42.

The magnet temperature detection section 54 may estimate the magnet temperature Tm based on the output from one of the temperature sensors 40 and 42. Alternatively, the magnet temperature detection section 54 may estimate the magnet temperature Tm based on the motor currents MCRT detected by the electric current sensors 24 and on the period of time during which the motor currents MCRT are supplied.

The carrier frequency control section 56 compares the magnet temperature Tm, received from the magnet temperature detection section 54, with a predetermined threshold value Tth and when it is determined that the magnet temperature Tm exceeds the threshold value Tth, the carrier frequency control section 56 outputs the signal CHG at H level (logical high) to the inverter PWM signal conversion section 52 to change the carrier frequency map used in the inverter PWM signal conversion section 52 from the map used under normal conditions to the map used while demagnetization is occurring. On the other hand, when it is determined that the magnet temperature Tm is equal to or below the threshold value Tth, the carrier frequency control section 56 outputs the signal CHG at L level (logical low) to the inverter PWM signal conversion section 52. A method of setting the threshold value Tth will be described later.

The inverter PWM signal conversion section 52 reads, out of a read only memory (ROM) (not shown), the carrier frequency map for setting the carrier frequency of the carrier signal, and sets the carrier frequency of the carrier signal with the use of the read-out carrier frequency map. In the carrier frequency map, as described later, the carrier frequencies corresponding to torques and rotational speeds of the permanent magnet motor M1 are contained in the form of a map and the inverter PWM signal conversion section 52 sets the carrier frequency based on the torque command value TR and the motor rotational speed MRN of the permanent magnet motor M1 with the use of the carrier frequency map read out of the ROM. The inverter PWM signal conversion section 52 generates the signal PWMI for actually turning on and off the IGBT devices Q3 to Q8 of the inverter 14 based on the computation result received from the motor control phase voltage computation section 50 and the set carrier frequency, and outputs the generated signal PWMI to the IGBT devices Q3 to Q8 of the inverter 14.

In this way, the switching on and off of the IGBT devices Q3 to Q8 is controlled to control the electric currents that are caused to flow through the respective phase arms of the permanent magnet motor M1 so that the permanent magnet motor M1 produces the torque according to the command. In this way, the motor drive current is controlled and the motor torque corresponding to the torque command value TR is output.

Figure 4:
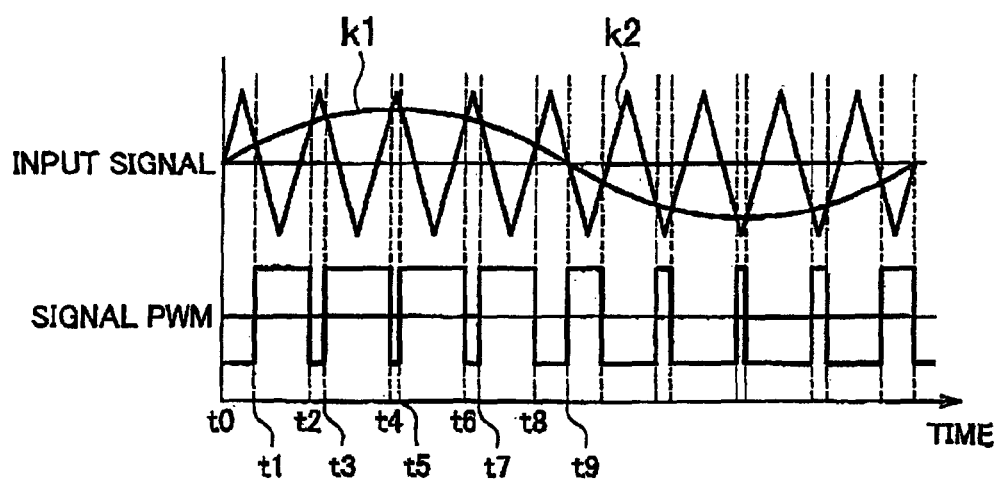
FIG. 4 is a waveform diagram for explaining a method by which an inverter PWM signal conversion section generates a signal PWMI.

FIG. 4 is a waveform diagram for explaining a method by which the inverter PWM signal conversion section 52 generates the signal PWMI. In FIG. 4, the method of generating the signal PWMI for the U phase is representatively shown and the signals for the other phases, V- and W-phases, are generated in a similar way.

Referring to FIG. 4, a curve k1 represents the U-phase voltage command signal generated by the motor control phase voltage computation section 50. A triangular wave signal k2 is a carrier signal generated by the inverter PWM signal conversion section 52 and has the carrier frequency set by the inverter PWM signal conversion section 52.

The inverter PWM signal conversion section 52 compares the curve k1 with the triangular wave signal k2 and generates the pulse signal PWMI in which the voltage value varies depending on which one of the curve k1 and the triangular wave signal k2 is greater than the other. The inverter PWM signal conversion section 52 outputs the generated signal PWMI to the inverter 14 and the IGBT devices Q3 to Q8 of the inverter 14 are switched on and off according to the signal PWMI.

When the IGBT devices Q3 to Q8 of the inverter 14 are switched on and off at the switching frequency depending on the carrier frequency of the carrier signal (triangular wave signal k2), ripple currents corresponding to the switching frequency occur. The peak-to-peak value that is the difference between the maximum value and the minimum value of the ripple current is proportional to one cycle T of the signal PWMI, which is equal to the sum of the time during which the IGBT device Q3 is turned on and the time during which the IGBT device Q4 is turned on. The cycle T can be obtained from the carrier frequency fc of the signal PWMI (T=1/fc).

When the ripple currents occur, the eddy-current loss due to eddy current generated in the permanent magnet increases in the permanent magnet motor M1. The increase in the eddy-current loss causes the magnet temperature to increase and therefore causes demagnetization in the permanent magnet motor M1. Thus, there is a possibility that the operational efficiency (rotation efficiency, power generation efficiency) of the permanent magnet motor M1 is reduced.

For this reason, the motor torque control means 301 according to this embodiment is configured so that the motor torque control means 301 functions as a means for suppressing demagnetization in the permanent magnet motor M1, that is, the motor torque control means 301 detects the magnet temperature Tm of the permanent magnet motor M1 and changes the carrier frequency according to the detected magnet temperature Tm.

Specifically, the threshold value Tth of the magnet temperature Tm is set in advance and when the detected magnet temperature Tm exceeds the threshold value Tth, the motor torque control means 301 changes the carrier frequency.

The carrier frequency is changed according to the magnet temperature Tm as described above because the eddy-current loss caused in the permanent magnet motor M1 due to the ripple currents received from the inverter 14 increases in proportion to the amount of the ripple currents. When it is determined that there is a possibility that the magnet temperature Tm is increased due to the increase in the eddy-current loss and demagnetization in the permanent magnet motor M1 therefore occurs, the carrier frequency is changed so as to reduce the ripple currents, whereby the increase in the magnet temperature Tm is suppressed and the occurrence of the demagnetization is suppressed.

Referring again to FIG. 3, the carrier frequency control section 56 sets the threshold value Tth that is used in the determination related to the magnet temperature Tm as described above, based on the torque command value TR and the motor rotational speed MRN that are received from the external ECU. Specifically, the carrier frequency control section 56 sets the threshold value Tth based on the torque command value TR and the motor rotational speed MRN, using the predetermined relation between the output (torque and rotational speed) of the permanent magnet motor M1 and the critical temperature, up to which demagnetization in the permanent magnet motor M1 is not caused.

Figure 5:
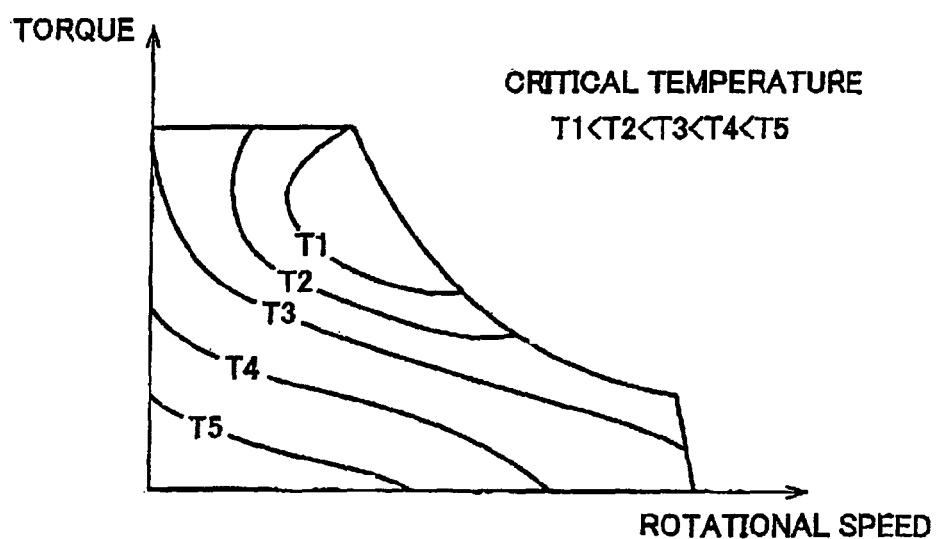
FIG. 5 is a diagram showing a relation between the output of a permanent magnet motor and the critical temperature, up to which demagnetization in the permanent magnet motor is not caused.

FIG. 5 is a diagram showing a relation between the output (torque and rotational speed) of the permanent magnet motor M1 and the critical temperature, up to which demagnetization in the permanent magnet motor M1 is not caused. The relation shown in FIG. 5 is, obtained by the following method: When the permanent magnet motor M1 is driven at a plurality of operational points, at each of which the torque and the rotational speed differ from those at another operational point, the critical temperature, up to which demagnetization in the permanent magnet motor M1 is not caused, is measured or computed for each of the plurality of operational points.

It can be seen from the relation shown in FIG. 5 that the critical temperature, up to which demagnetization in the permanent magnet motor M1 is not caused, varies depending on the output (torque and rotational speed) of the permanent magnet motor M1 and in the region in which the output is relatively higher, the critical temperature is low as compared to the critical temperature in the region in which the output is relatively lower. In other words, the higher the output of the permanent magnet motor M1 becomes, the more easily the demagnetization occurs.

The relation shown in FIG. 5 is stored in the ROM (not shown) in advance and when the carrier frequency control section 56 receives the torque command value TR and the motor rotational speed MRN from the external ECU, the carrier frequency control section 56 determines the critical temperature at the operational point of the permanent magnet motor M1 that is determined based on the torque command value TR and the motor rotational speed MRN, by referring to the relation shown in FIG. 5 read out of the ROM. The determined critical temperature is set as the threshold value Tth of the magnet temperature Tm. In this way, it is made possible to correctly determine whether there is a possibility of the occurrence of demagnetization, for each of the pairs of torque and rotational speed of the permanent magnet motor M1. Thus, it is possible to effectively suppress the occurrence of demagnetization in the permanent magnet motor M1.

The carrier frequency control section 56 then compares the magnet temperature Tm received from the magnet temperature detection section 54 with the set threshold value Tth and when it is determined that the magnet temperature Tm exceeds the threshold value Tth, the carrier frequency control section 56 outputs the signal CHG at H level to the inverter PWM signal conversion section 52. On the other hand, when it is determined that the magnet temperature Tm is equal to or below the threshold value Tth, the carrier frequency control section 56 outputs the signal CHG at L level to the inverter PWM signal conversion section 52.

When the signal CHG from the carrier frequency control section 56 is at H level, it is determined that the possibility of the occurrence of demagnetization in the permanent magnet motor M1 is high, and therefore, the inverter PWM signal conversion section 52 reads the carrier frequency map used while the demagnetization is occurring and the read-out carrier frequency map used while the demagnetization is occurring is used to set the carrier frequency.

On the other hand, when the signal CHG from the carrier frequency control section 56 is at L level, it is determined that the possibility of the occurrence of demagnetization in the permanent magnet motor M1 is low, and therefore, the inverter PWM signal conversion section 52 sets the carrier frequency with the use of the carrier frequency map used under normal conditions.

Figure 6:
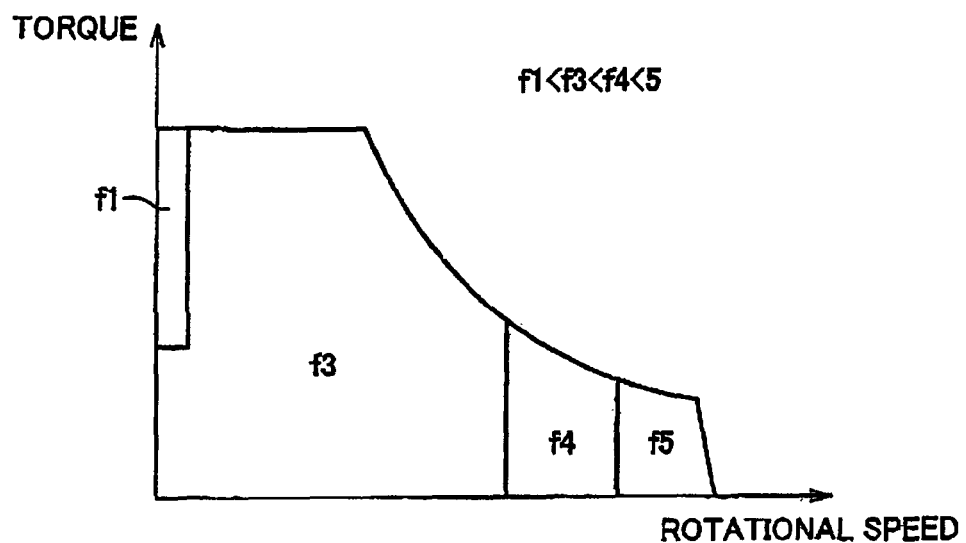
FIG. 6 is a diagram showing an example of a carrier frequency map used under normal conditions.
Figure 7:
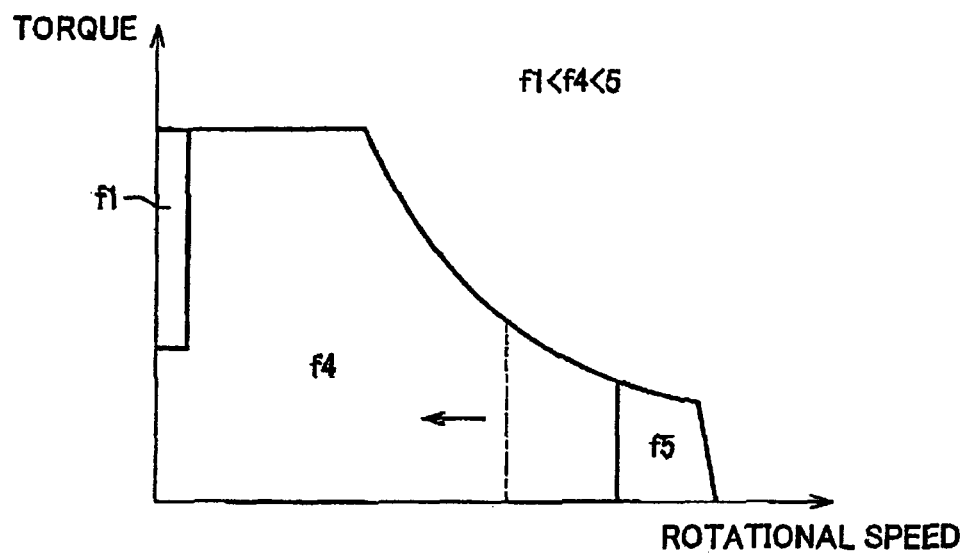
FIG. 7 is a diagram showing an example of a carrier frequency map used while the demagnetization is occurring.

FIGS. 6 and 7 are diagrams showing examples of the carrier frequency map. FIG. 6 shows a carrier frequency map used under normal conditions. FIG. 7 shows a carrier frequency map used while the demagnetization is occurring.

Referring to FIG. 6, in the carrier frequency map used under normal conditions, the entire region is divided into four regions according to the torque and rotational speed of the permanent magnet motor M1. In the region in which the rotational speed of the permanent magnet motor M1 is low and the torque thereof is high, the carrier frequency is set to the lowest frequency f1. As the rotational speed of the permanent magnet motor M1 increases, the carrier frequency is set to frequencies f3, f4, f5 that are higher than the frequency f1. These frequencies f3, f4, f5 are set so that the frequency f3 in the region in which the rotational speed is low is the lowest and the frequency f5 in the region in which the rotational speed is high is the highest.

The higher the rotational speed becomes, the higher the carrier frequency is set, in order to ensure sufficient response in performing control according to the desired output of the permanent magnet motor M1. On the other hand, in the low and middle rotational-speed region in which the required level of the response in performing control is not so high as is required in the high rotational-speed region, the carrier frequency is set lower as compared to that in the high rotational-speed region in order to reduce the power loss (switching loss) in the inverter 14.

The carrier frequency is set to the lowest frequency f1 in the region, in which the rotational speed is low and the torque is high, in order to prevent an excessive current from flowing through particular IGBT devices of the inverter 14 when a torque command cannot increase the rotational speed of the permanent magnet motor M1, that is, when the permanent magnet motor M1 is in a so-called locked state.

On the other hand, referring to FIG. 7, in the carrier frequency map used while the demagnetization is occurring, the high-frequency region is expanded as compared to that of the carrier frequency map used under normal conditions shown in FIG. 6. Specifically, the region in which the carrier frequency is the frequency f4 is expanded toward the low rotational speed side, so that in the region in which the carrier frequency is the frequency f3 in the carrier frequency map used under normal conditions, the carrier frequency is changed to the frequency f4. Because the ripple currents from the inverter 14 are reduced by increasing the carrier frequency, it is possible to suppress the increase in the eddy-current loss caused in the permanent magnet motor M1. Thus, it becomes possible to suppress the occurrence of the demagnetization by suppressing the increase in the magnet temperature Tm.

Figure 8:
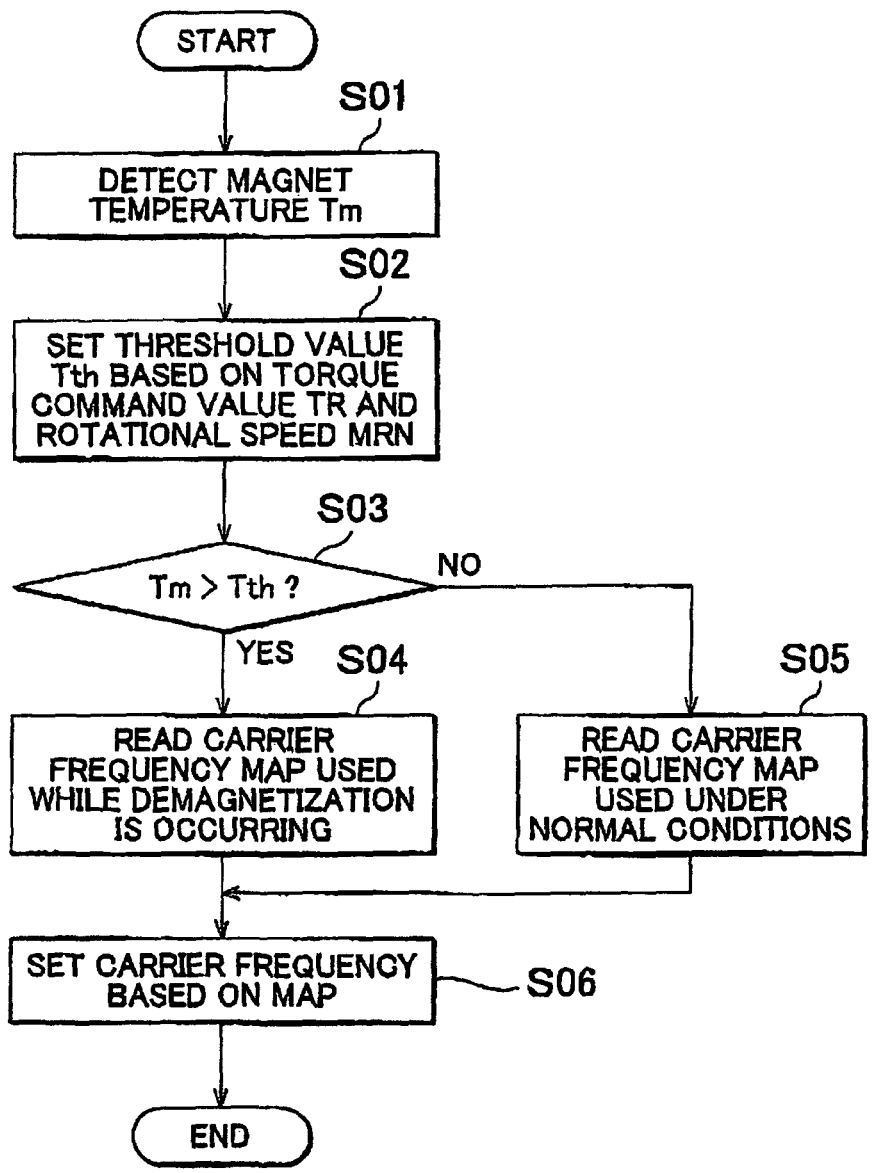
FIG. 8 is a flow chart of control for setting a carrier frequency according to the first embodiment of the invention.

FIG. 8 is a flow chart of control for setting the carrier frequency. A series of control steps of the flow chart shown in FIG. 8 are performed by executing the program, stored in the controller 30 in advance, in a predetermined cycle.

Referring to FIG. 8, the magnet temperature detection section 54 detects the magnet temperature Tm by estimating the magnet temperature Tm based on the stator temperature Tst and the cooling oil temperature To received from the temperature sensors 40 and 42 (step S01).

When the carrier frequency control section 56 receives the torque command value TR and the motor rotational speed MRN from the external ECU, by referring to the relation shown in FIG. 5 read out of the ROM, the carrier frequency control section 56 determines the critical temperature of the permanent magnet motor M1 at the operational point of the permanent magnet motor M1 that is determined based on the torque command value TR and the motor rotational speed MRN. The carrier frequency control section 56 sets the determined critical temperature as the threshold value Tth (step S02).

Next, the carrier frequency control section 56 determines whether the magnet temperature Tm that is detected in step S01 is higher than the threshold value Tth (step S03). When the magnet temperature Tm is higher than the threshold value Tth (YES in step S03), the carrier frequency control section 56 determines that the possibility of the occurrence of demagnetization in the permanent magnet motor M1 is high, and outputs the signal CHG at H level to the inverter PWM signal conversion section 52. Then, when the inverter PWM signal conversion section 52 receives the signal CHG at H level from the carrier frequency control section 56, the inverter PWM signal conversion section 52 reads, out of the ROM, the carrier frequency map (FIG. 7) used while the demagnetization is occurring (step S04).

On the other hand, when the magnet temperature Tm is equal to or below the threshold value Tth (NO in step S03), the carrier frequency control section 56 determines that the possibility of the occurrence of demagnetization in the permanent magnet motor M1 is low, and outputs the signal CHG at L level to the inverter PWM signal conversion section 52. When the inverter PWM signal conversion section 52 receives the signal CHG at L level from the carrier frequency control section 56, the inverter PWM signal conversion section 52 reads the carrier frequency map (FIG. 6) out of the ROM (step S05).

The inverter PWM signal conversion section 52 sets the carrier frequency based on the torque command value TR and the motor rotational speed MRN of the permanent magnet motor M1 with the use of the carrier frequency map used while the demagnetization is occurring or the carrier frequency map used under normal conditions (step S06).

As described above, according to the first embodiment of the invention, when it is determined that the possibility of the occurrence of demagnetization in the permanent magnet motor M1 is high, the carrier frequency of the inverter 14 is changed so as to reduce the ripple currents, whereby it is possible to reduce the eddy-current loss caused in the permanent magnet motor M1. Thus, it is possible to suppress the occurrence of demagnetization by suppressing the increase in the magnet temperature Tm.

In the above embodiment, a configuration is employed in which when the magnet temperature Tm exceeds the threshold value Tth, the carrier frequency is changed with the use of the carrier frequency map used while the demagnetization is occurring. However, a configuration may be employed in which a plurality of such threshold values Tth are set stepwise and the carrier frequency is changed stepwise according to the magnet temperature Tm.

Second Embodiment

Figure 9:
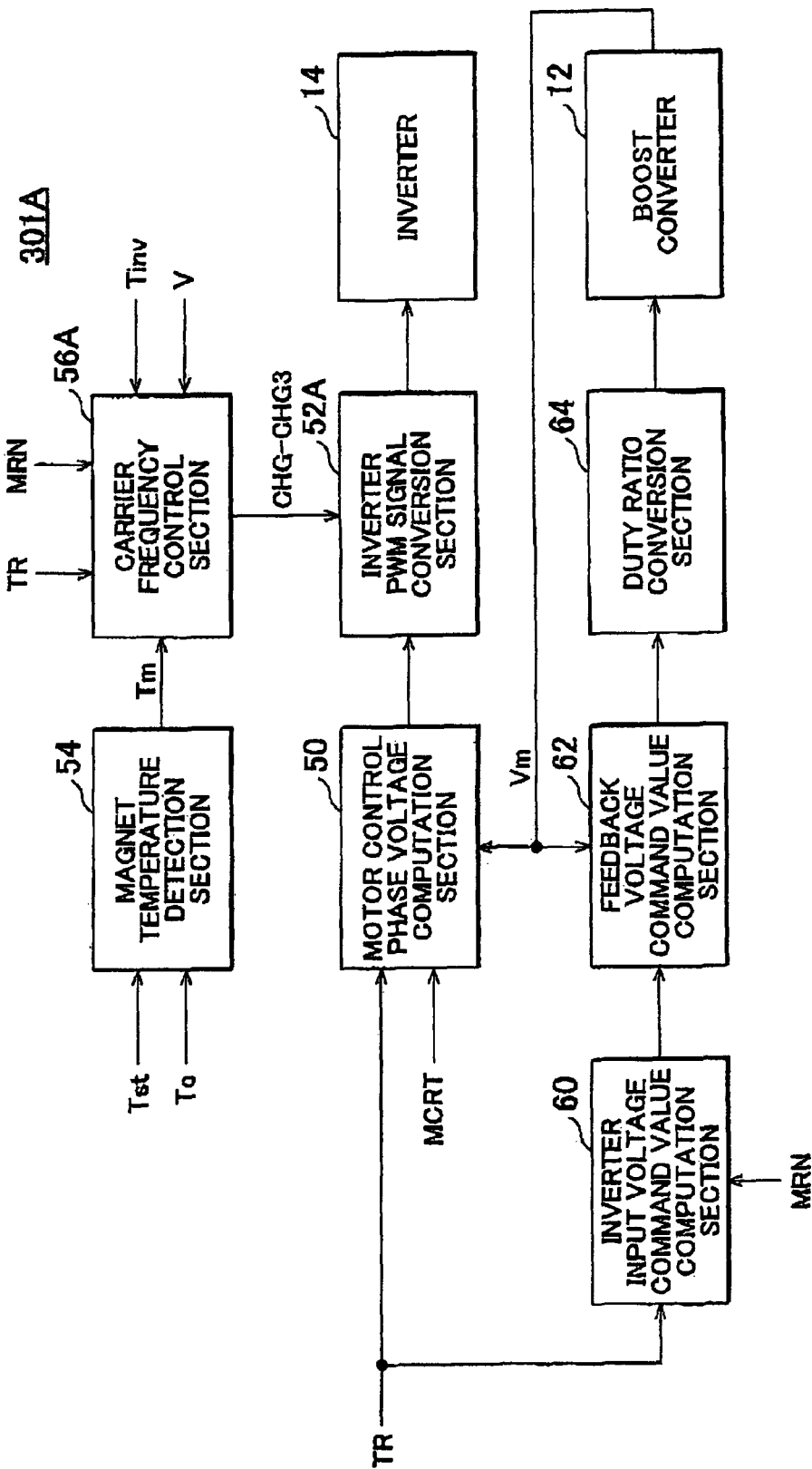
FIG. 9 is a functional block diagram of a motor torque control means according to a second embodiment of the invention.

FIG. 9 is a functional block diagram of a motor torque control means 301A according to a second embodiment of the invention. The motor torque control means 301A shown in FIG. 9 is obtained by replacing the inverter PWM signal conversion section 52 and the carrier frequency control section 56 of the motor torque control means 301 shown in FIG. 3 by an inverter PWM signal conversion section 52A and a carrier frequency control section 56A, respectively. For this reason, repetitive detailed description of the other common portions is not given.

Referring to FIG. 9, the carrier frequency control section 56A receives the magnet temperature Tm from the magnet temperature detection section 54, receives the device temperature Tinv of the inverter 14 from the temperature sensor 44 (FIG. 1), and receives a vehicle speed V from the vehicle speed sensor (not shown). The carrier frequency control section 56A generates the signals CHG1, CHG2, and CHG3 for changing the carrier frequency map that is used in the inverter PWM signal conversion section 52A, from the map used under normal conditions to a suitable map and outputs the signals CHG1, CHG2, and CHG3 to the inverter PWM signal conversion section 52A.

Specifically, the carrier frequency control section 56A compares the magnet temperature Tm with the threshold value Tth and when it is determined that the magnet temperature Tm exceeds the threshold value Tth, the carrier frequency control section 56A outputs the signal CHG1 at H level to the inverter PWM signal conversion section 52A. On the other hand, when it is determined that the magnet temperature Tm is equal to or below the threshold value Tth, the carrier frequency control section 56A outputs the signal CHG1 at L level to the inverter PWM signal conversion section 52A. The threshold value Tth is set based on the torque command value TR and the motor rotational speed MRN received from the external ECU in a way the same as that described in the above description of the first embodiment.

The carrier frequency control section 56A compares a device temperature Tinv of the inverter 14 with a predetermined allowable temperature Tlim set in advance and when it is determined that the device temperature Tinv exceeds the allowable temperature Tlim, the carrier frequency control section 56A outputs the signal CHG2 at H level to the inverter PWM signal conversion section 52A. On the other hand, when it is determined that the device temperature Tinv is equal to or below the allowable temperature Tlim, the carrier frequency control section 56A outputs the signal CHG2 at L level to the inverter PWM signal conversion section 52A.

The predetermined allowable temperature Tlim is set based on the upper temperature limit of the IGBT devices Q3 to Q8 that constitute the inverter 14 and on the power loss caused when the IGBT devices Q3 to Q8 are switched on and off. Specifically, when the device temperature Tinv exceeds the allowable temperature Tlim, it is determined that the possibility is high that the IGBT devices Q3 to Q8 are thermally damaged.

The carrier frequency control section 56A compares the vehicle speed V with a reference speed Vstd set in advance and when it is determined that the vehicle speed V is lower than the reference speed Vstd, the carrier frequency control section 56A outputs the signal CHG3 at H level to the inverter PWM signal conversion section 52A. On the other hand, when it is determined that the vehicle speed V is equal to or above the reference speed Vstd, the carrier frequency control section 56A outputs the signal CHG3 at L level to the inverter PWM signal conversion section 52A.

The predetermined reference speed Vstd is set to a vehicle speed such that the noise (switching noise) generated when the IGBT devices Q3 to Q8 of the inverter 14 are switched on and off can exceed the level of the noise that is generated by the engine and the auxiliary equipment, such as the air compressor. Specifically, when the vehicle speed V falls below the reference speed Vstd, the switching noise is not drown out by the ambient noise and it is therefore determined that the possibility is high that silence is disrupted.

When the signal CHG1 from the carrier frequency control section 56A is at H level, it is determined that the possibility of the occurrence of demagnetization in the permanent magnet motor M1 is high and therefore, the inverter PWM signal conversion section 52A reads the carrier frequency map used while the demagnetization is occurring and sets the carrier frequency with the use of the read-out carrier frequency map used while the demagnetization is occurring.

On the other hand, when the signal CHG2 from the carrier frequency control section 56A is at H level, it is determined that the possibility is high that the switching devices of the inverter 14 are overheated and therefore, the inverter PWM signal conversion section 52A reads the carrier frequency map used under high-temperature conditions and sets the carrier frequency with the use of the read-out carrier frequency map used under high-temperature conditions.

When the signal CHG3 from the carrier frequency control section 56A is at H level, it is determined that the possibility is high that silence is disrupted by the switching noise and therefore, the inverter PWM signal conversion section 52A reads the carrier frequency map used during low-speed travel and sets the carrier frequency with the use of the read-out carrier frequency map used during low-speed travel.

Figure 10:
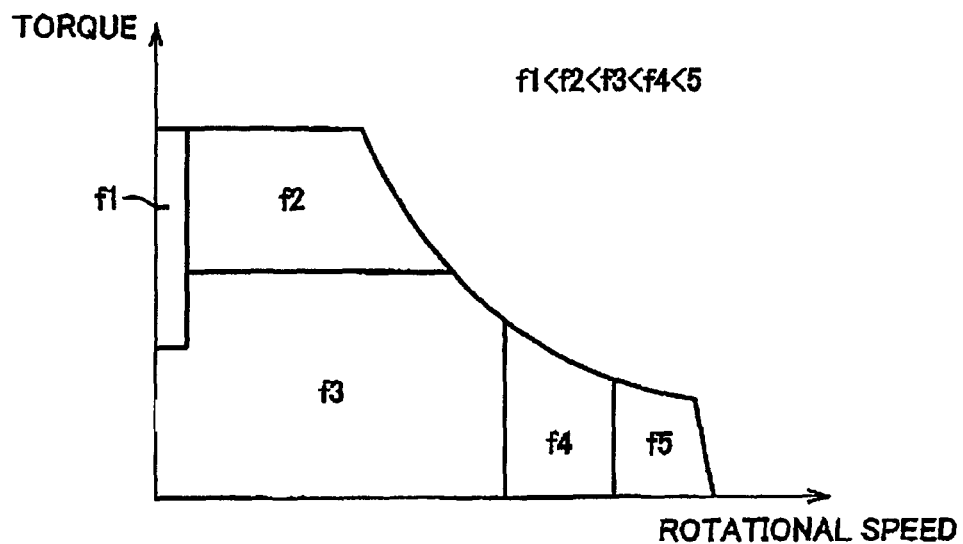
FIG. 10 is a diagram showing an example of a carrier frequency map used under high-temperature conditions.

FIG. 10 is a diagram showing examples of the carrier frequency map used under high-temperature conditions. Referring to FIG. 10, in the carrier frequency map used under high-temperature conditions, the low-frequency region is expanded as compared to the carrier frequency map used under normal conditions shown in FIG. 6. Specifically, in a region in which the torque is relatively high, the carrier frequency is changed to the frequency f2 that is lower than the frequency f3 of the carrier frequency map used under normal conditions. The reason why the carrier frequency in the high-torque region is reduced in this way is that higher torque requires greater electric current and is therefore prone to increase the electric current loss. For this reason, by reducing the carrier frequency to reduce the electric current loss in the high-torque region, it is possible to prevent the IGBT devices Q3 to Q8 from being overheated.

Figure 11:
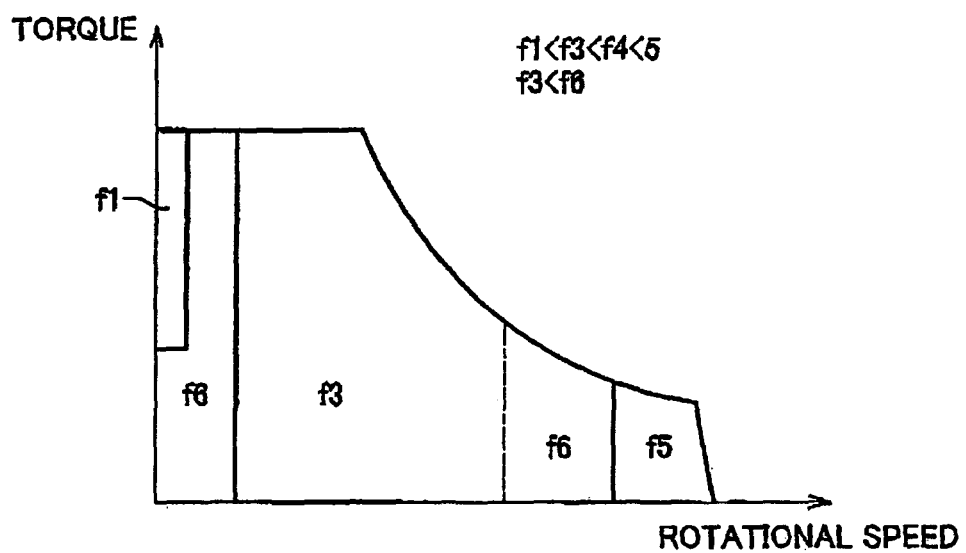
FIG. 11 is a diagram showing an example of a carrier frequency map used during low-speed travel.

FIG. 11 is a diagram showing an example of the carrier frequency map used during low-speed travel. Referring to FIG. 11, the carrier frequency map used during low-speed travel is changed from the carrier frequency map used under normal conditions shown in FIG. 6 in that the frequency f3 in the low speed region is changed to a higher frequency f6. The frequency f6 after the change is set so as to be a frequency out of the audible frequency range.

The reason why the carrier frequency is set to a frequency out of the audible frequency range in the low-speed region is that when the vehicle is stopped or traveling at low speeds, the switching noise becomes noticeable because the ambient noise level is low. Because, in the low-speed region, the carrier frequency is set at a low frequency that is within the audible frequency range, it is possible to reduce the switching noise by changing the carrier frequency to a frequency above the audible frequency range.

Because it suffices that the carrier frequency after the change is out of the audible frequency range, the frequency may be reduced relative to the frequency f3 in the carrier frequency map used under normal conditions.

Figure 12:
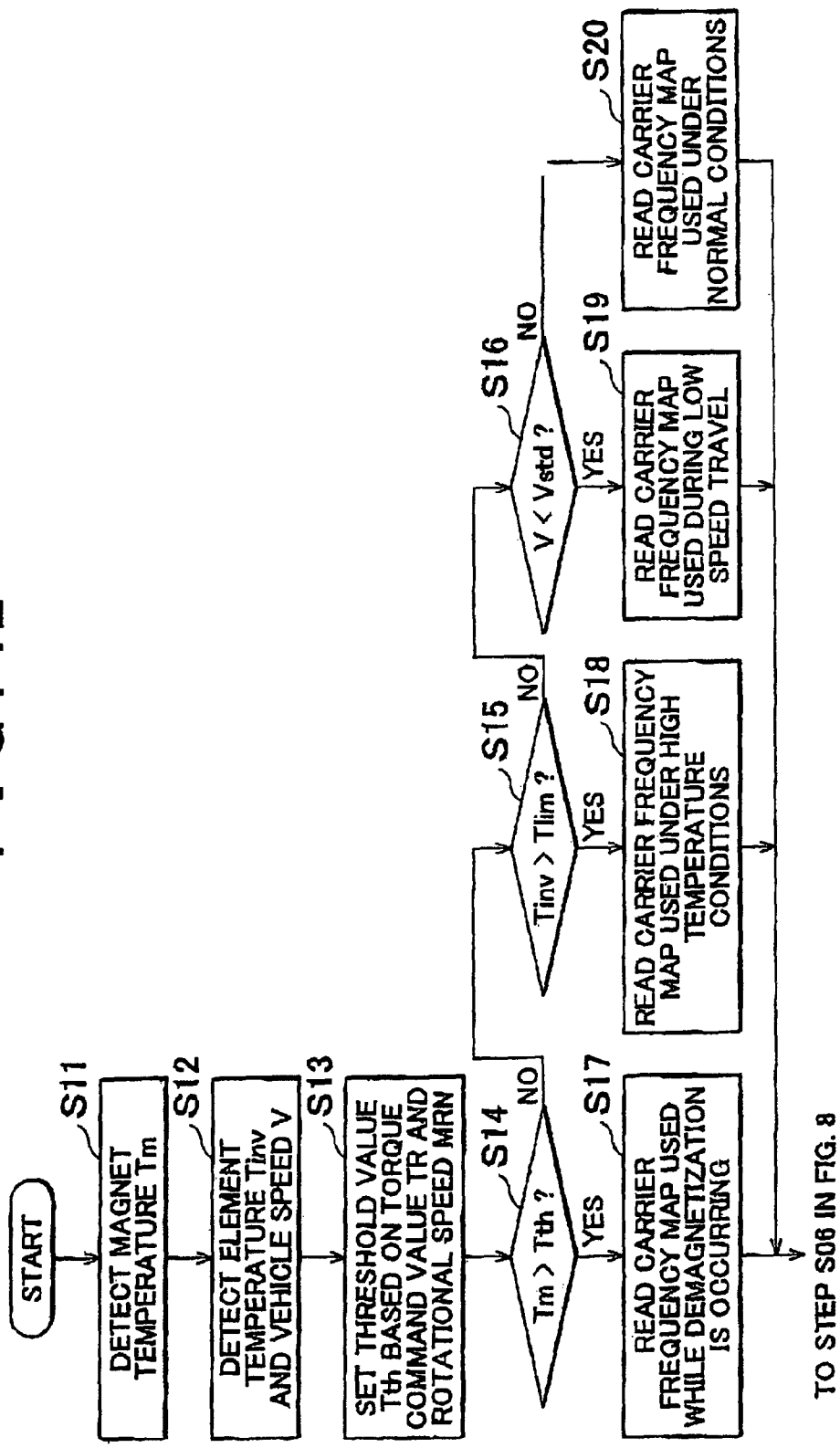
FIG. 12 is a flow chart of control for setting a carrier frequency according to the second embodiment of the invention.

FIG. 12 is a flow chart of control for setting the carrier frequency. A series of control steps of the flow chart shown in FIG. 12 is performed by executing the program, stored in the controller 30 in advance, in a predetermined cycle.

Referring to FIG. 12, the magnet temperature detection section 54 detects the magnet temperature Tm by estimating the magnet temperature Tm based on the stator temperature Tst and the cooling oil temperature To received from the temperature sensors 40 and 42 (step S11). The carrier frequency control section 56A receives the magnet temperature Tm detected by the magnet temperature detection section 54.

The carrier frequency control section 56A further detects the device temperature Tinv of the inverter 14 based on the output from the temperature sensor 44. In addition, the carrier frequency control section 56A detects the vehicle speed V based on the output from the vehicle speed sensor (step S12).

When the carrier frequency control section 56A receives the torque command value TR and the motor rotational speed MRN from the external ECU, the carrier frequency control section 56A determines the critical temperature, up to which the demagnetization in the permanent magnet motor M1 is not caused, at the operational point of the permanent magnet motor M1 that is determined based on the torque command value TR and the motor rotational speed MRN, by referring to the relation shown in FIG. 5 read out of the ROM. The carrier frequency control section 56A sets the determined critical temperature as the threshold value Tth (step S13).

Next, the carrier frequency control section 56A determines whether the magnet temperature Tm detected in step S11 is higher than the threshold value Tth (step S14). When the magnet temperature Tm is higher than the threshold value Tth (YES in step S14), the carrier frequency control section 56A determines that the possibility of the occurrence of demagnetization in the permanent magnet motor M1 is high, and outputs the signal CHG1 at H level to the inverter PWM signal conversion section 52A. Then, when the inverter PWM signal conversion section 52A receives the signal CHG1 at H level from the carrier frequency control section 56A, the inverter PWM signal conversion section 52A reads, out of the ROM, the carrier frequency map (FIG. 7) used while the demagnetization is occurring (step S17).

On the other hand, when the magnet temperature Tm is equal to or below the threshold value Tth (NO in step S14), the carrier frequency control section 56A determines that the possibility of the occurrence of demagnetization in the permanent magnet motor M1 is low. Then, the carrier frequency control section 56A determines whether the device temperature Tinv detected in step S12 is higher than the allowable temperature Tlim (step S15). When it is determined that the device temperature Tinv is higher than the allowable temperature Tlim (YES in step S15), the carrier frequency control section 56A determines that the possibility is high that the IGBT devices Q3 to Q8 of the inverter 14 are damaged, and outputs the signal CHG2 at H level to the inverter PWM signal conversion section 52A. When the inverter PWM signal conversion section 52A receives the signal CHG2 at H level from the carrier frequency control section 56A, the inverter PWM signal conversion section 52A reads, out of the ROM, the carrier frequency map used under high-temperature conditions (FIG. 10) (step S18).

On the other hand, when the device temperature Tinv is equal to or below the allowable temperature Tlim (NO in step S15), the carrier frequency control section 56A determines that the possibility is low that the IGBT devices Q3 to Q8 of the inverter 14 are damaged, and further determines whether the vehicle speed V detected in step S12 is lower than the reference speed Vstd (step S16).

When the vehicle speed V is lower than the reference speed Vstd (YES in step S16), the carrier frequency control section 56A determines that the possibility is high that silence is disrupted by the switching noise generated by the inverter 14, and outputs the signal CHG3 at H level to the inverter PWM signal conversion section 52A. When the inverter PWM signal conversion section 52A receives the signal CHG3 at H level from the carrier frequency control section 56A, the inverter PWM signal conversion section 52A reads, out of the ROM, the carrier frequency map used during low-speed travel (FIG. 11) (step S19).

On the other hand, when the vehicle speed V is equal to or higher than the reference speed Vstd (NO in step S16), the carrier frequency control section 56A determines that all of the possibility of the occurrence of demagnetization in the permanent magnet motor M1, the possibility that the IGBT devices Q3 to Q8 are damaged, and the possibility that silence is disrupted are low, and the carrier frequency control section 56A outputs the signals CHG1, CHG2, and CHG3 all at L level to the inverter PWM signal conversion section 52A. When the inverter PWM signal conversion section 52A receives the signals CHG1, CHG2, and CHG3 at L level from the carrier frequency control section 56A, the inverter PWM signal conversion section 52A reads, out of the ROM, the carrier frequency map used under normal conditions (FIG. 6) (step S20).

The inverter PWM signal conversion section 52A sets the carrier frequency based on the torque command value TR and the motor rotational speed MRN of the permanent magnet motor M1 with the use of one of the carrier frequency map used while the demagnetization is occurring, the carrier frequency map used under high-temperature conditions, the carrier frequency map used during low-speed travel, and the carrier frequency map used under normal conditions (step S06 in FIG. 8).

As described above, according to the second embodiment of the invention, in each of the case where it is determined that the possibility of the occurrence of demagnetization in the permanent magnet motor M1 is high, the case where it is determined that the possibility is high that the IGBT devices Q3 to Q8 constituting the inverter 14 are damaged, and the case where it is determined that the possibility is high that silence in the vehicle is disrupted, the carrier frequency is changed with the use of the carrier frequency map suitable for reducing the possibility, so that it is possible to effectively settle these situations.

Although the above embodiment is configured such that one of a plurality of carrier frequency maps is selected depending on the logical levels of the signals CHG1, CHG2, and CHG3 from the carrier frequency control section 56A. However, the order of priority among the prevention of demagnetization in the permanent magnet motor M1, the thermal protection of the inverter 14, and the securing of silence may be fixed in advance and the carrier frequency map may be appropriately selected according to the fixed order of priority.

The correspondence between the components of the embodiments and components of the invention is as follows: the permanent magnet motor M1 functions as the "permanent magnet motor" of the invention; the inverter 14 functions as the "inverter" of the invention; and the controller 30 functions as the "controller" of the invention. In addition, the controller 30 functions as the "magnet temperature detection device," "setting device," and "carrier frequency control device" of the invention.

The embodiments herein described are merely examples and the invention is therefore not limited to these embodiments. The scope of the invention is defined not by the above description but by the claims and it is intended to include all the modifications within the scope of the claims and the equivalent thereof.

The invention claimed is:

1. A motor driver that receives electric power supply from a power source to drive a permanent magnet motor, the motor driver comprising:

an inverter that includes a switching device and performs electric power conversion between the power source and the permanent magnet motor; and a controller that controls switching of the switching device according to a desired output of the permanent magnet motor, wherein the controller includes:

a magnet temperature detection device that detects a magnet temperature of the permanent magnet motor;

a setting device that sets a threshold value of the magnet temperature corresponding to the desired output of the permanent magnet motor, based on a predetermined relation between an output from the permanent magnet motor and a critical temperature, up to which demagnetization in the permanent magnet motor is not caused; and a carrier frequency control device that, when the magnet temperature detected by the magnet temperature detection device exceeds the threshold value, changes a carrier frequency, at which the switching device is switched, in such a manner that a ripple current superimposed on a motor current that flows through the permanent magnet motor is reduced.

2. The motor driver according to claim 1, wherein the carrier frequency control device increases the carrier frequency when the magnet temperature detected by the magnet temperature detection device exceeds the threshold value.

3. The motor driver according to claim 2, wherein:

the carrier frequency control device has a first map for setting the carrier frequency according to the output from the permanent magnet motor, in which first map an entire region is divided into a plurality of regions, in each of which the carrier frequency is set that differs from the carrier frequency set in another region, based on a torque and rotational speed of the permanent magnet motor;

the plurality of regions include a first region in which the carrier frequency is set relatively high and a second region in which the carrier frequency is set lower than the carrier frequency set in the first region; and when the magnet temperature detected by the magnet temperature detection device exceeds the threshold value, the carrier frequency control device changes the carrier frequency by setting the carrier frequency with the use of a second map that is obtained by changing the first map so that the first region in the first map is expanded toward the second region.

4. The motor driver according to claim 1, wherein the controller further includes a device temperature detection device that detects a device temperature of the switching device, and if the magnet temperature detected by the magnet temperature detection device is equal to or below the threshold value, the carrier frequency control device reduces the carrier frequency when the device temperature detected by the device temperature detection device exceeds a predetermined allowable temperature.

5. The motor driver according to claim 1, wherein:

the permanent magnet motor is configured to generate a driving force of a vehicle;

the controller further includes a vehicle speed detection device that detects a speed of the vehicle; and if the magnet temperature detected by the magnet temperature detection device is equal to or below the threshold value, the carrier frequency control device changes the carrier frequency to a frequency out of an audible frequency range when the vehicle speed detected by the vehicle speed detection device is lower than a predetermined reference speed.

6. A method of controlling a motor driver that receives electric power supply from a power source to drive a permanent magnet motor, the motor driver including an inverter that includes a switching device and performs electric power conversion between the power source and the permanent magnet motor by switching the switching device, the method comprising:

detecting a magnet temperature of the permanent magnet motor;

setting a threshold value of the magnet temperature corresponding to the desired output of the permanent magnet motor, based on a predetermined relation between an output from the permanent magnet motor and a critical temperature, up to which demagnetization in the permanent magnet motor is not caused; and when the detected magnet temperature exceeds the threshold value, changing a carrier frequency, at which the switching device is switched, in such a manner that a ripple current superimposed on a motor current that flows through the permanent magnet motor is reduced.

7. The method according to claim 6, wherein the step of changing the carrier frequency increases the carrier frequency when the detected magnet temperature exceeds the threshold value.

8. The method according to claim 7, wherein:

the step of changing the carrier frequency uses a first map for setting the carrier frequency according to the output from the permanent magnet motor, in which first map an entire region is divided into a plurality of regions, in each of which the carrier frequency is set such that it differs from the carrier frequency set in another region, based on a torque and rotational speed of the permanent magnet motor;

the plurality of regions include a first region in which the carrier frequency is set relatively high and a second region in which the carrier frequency is set lower than the carrier frequency set in the first region; and when the detected magnet temperature exceeds the threshold value, the step of changing the carrier frequency changes the carrier frequency by setting the carrier frequency with the use of a second map that is obtained by changing the first map so that the first region in the first map is expanded toward the second region.

9. The method according to claim 6, further comprising detecting a device temperature of the switching device, wherein if the detected magnet temperature is equal to or below the threshold value, the step of changing the carrier frequency reduces the carrier frequency when the detected device temperature exceeds a predetermined allowable temperature.

10. The method according to claim 6, wherein:

the permanent magnet motor is configured to generate a driving force of a vehicle;

the method further comprises detecting a speed of the vehicle; and if the magnet temperature detected is equal to or below the threshold value, the step of changing the carrier frequency changes the carrier frequency to a frequency out of an audible frequency range when the detected vehicle speed is lower than a predetermined reference speed.

* * * * *

UNITED STATES PATENT AND TRADEMARK OFFICE
CERTIFICATE OF CORRECTION

PATENT NO. : 8,581,533 B2
APPLICATION NO. : 13/123475
DATED : November 12, 2013
INVENTOR(S) : K. Hayashi et al.

It is certified that error appears in the above-identified patent and that said Letters Patent is hereby corrected as shown below:

In the Specification

At column 1, line 4, please change "PCT/82009/" to -- PCT/IB2009/ --.

Signed and Sealed this
Fifteenth Day of April, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,581,533 B2                                                                 Page 1 of 1
APPLICATION NO.   : 13/123475
DATED             : November 12, 2013
INVENTOR(S)       : Hayashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 395 days.

Signed and Sealed this
Twenty-second Day of September, 2015

Michelle K. Lee
*Director of the United States Patent and Trademark Office*